March 7, 1939.   R. M. POTTS   2,149,464
FLY-ROD MINNOW
Filed Feb. 17, 1938

INVENTOR.
Robert M. Potts
BY John D. McLeran
ATTORNEY.

Patented Mar. 7, 1939

2,149,464

UNITED STATES PATENT OFFICE 2,149,464

FLY-ROD MINNOW

Robert M. Potts, Dayton, Ohio

Application February 17, 1938, Serial No. 191,022

3 Claims. (Cl. 43—42)

This invention relates to improvements in artificial bait or flyrod minnows and has for its object to provide a bait or minnow that resembles a natural minnow.

It is also an object of this invention to provide an artificial bait or fly-rod minnow composed of laminae of some suitable material, shaped and colored to resemble a minnow.

It is also an object of this invention to provide an artificial bait or fly-rod minnow composed of laminated material that is curved so that the bait or minnow will have a fluttering movement when drawn through the water.

It is also an object of this invention to provide an artificial bait or fly-rod minnow composed of layers of some suitable materials, the outer surfaces of which are made to resemble that of a fish.

It is also an object of this invention to provide an artificial bait or fly-rod minnow composed of layers of Celluloid suitably joined and formed to resemble in shape a small fish.

It is also an object of this invention to provide an artificial bait or fly-rod minnow composed of layers of Celluloid suitably united and shaped similar to a fish, and having the color and appearance of a natural fish.

It is also an object of this invention to provide an artificial bait or fly-rod minnow composed of a plurality of layers of Celluloid, united and formed to resemble a minnow, and having between certain of the layers a coloring material that gives to the minnow a silver or gold-like appearance.

It is also an object of this invention to provide an artificial bait or fly-rod minnow of a composite nature and variously tinted or colored to resemble a small fish.

In the accompanying drawing, in which like numerals are employed to designate like parts of the same:

Figure 1:
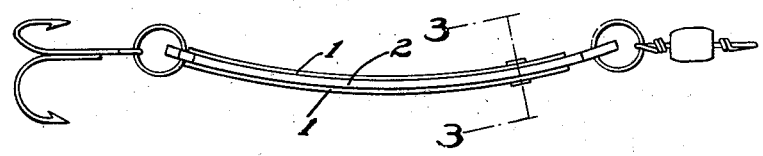
Figure 1 shows the edge of the artificial bait or fly-rod minnow, with a hook attached to one end and parts of a line to the other end.
Figure 2:
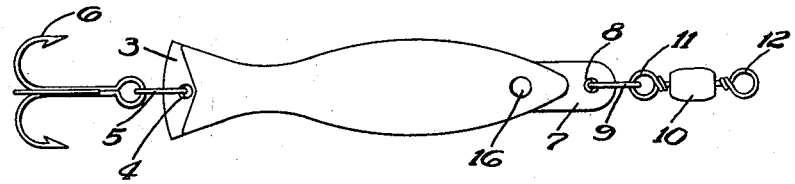
Figure 2 is a side view of the bait or fly-rod minnow with a hook and parts of the line attached thereto.
Figure 3:
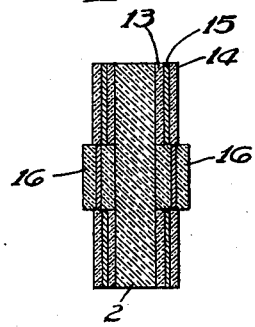
Figure 3 is a section on line 3—3 of Figure 1.

The bait or minnow is composed in the present illustrations of three layers of some suitable material. Celluloid has been found to be an excellent material for this purpose. There are two outer layers 1, and an intermediate layer 2. The intermediate layer has an extension 3 at the tail end of the minnow with a hole 4 therein to receive a link 5, by which the hook 6 is attached to the minnow. The front end of the intermediate layer has an extension 7 provided with a hole 8 therein to receive a link 9 to which the line will be attached. In the present instance, this link 5 is shown connected to a swivel 10 which has an eye 11 in engagement with the link 9 and an eye 12 to which the line may be attached.

Each outer layer is itself a composite structure having two outer laminae 13 and 14 and intermediate lamina 15 which is composed of some suitable coloring material, visible through the laminae 13 and 14 preferably made of Celluloid, which is colorless and transparent. This lamina 15, which serves to give color to the bait or minnow, may be composed of finely divided particles of metal caused to adhere to the laminae 13 and 14 by some suitable material which serves as a binder for the laminae 13 and 14. The three layers 1 and 2, are caused to adhere to each other by any suitable means. This means may be Celluloid glue, or the surfaces of the layers may be partially dissolved and caused to adhere by pressure.

The bait or minnow is provided with eye insert 16 formed in the same manner and of the same kind of material as the outer layers of the bait or minnow, but may be colored differently from that of the layers forming the sides of the minnow.

A bait or minnow such as that above described and shown in the drawing may be made to resemble in color any fish by selecting a properly colored material for the intermediate lamina between the laminae 13 and 14.

What I claim is:

1. A fly-rod minnow having an inner member and two outer composite members, each composite member having outer laminae of Celluloid and an inner lamina of some powdered or granulated material whereby the minnow is given the color desired.

2. In a fly-rod member, a pair of composite members, means to cause said composite members to adhere to each other, and a composite insert located in each first named composite member to form in the minnow that which resembles eyes, each of said composite members having an inner layer of coloring material.

3. In a fly-rod minnow, a central member, a pair of lateral members, said lateral members each being composed of a pair of laminae of Celluloid, and an intermediate layer of powdered material, and means for causing all of said members to adhere.

ROBERT M. POTTS.